United States Patent [19]

Sato et al.

[11] 4,390,616

[45] Jun. 28, 1983

[54] IMAGE RECORDING MEMBERS

[75] Inventors: Kozo Sato; Ken Iwakura, both of Minami-ashigara; Akira Igarashi, Fujinomiya, all of Japan

[73] Assignee: Fuji Photo Film Co., Ltd., Kanagawa, Japan

[21] Appl. No.: 212,010

[22] Filed: Dec. 1, 1980

[30] Foreign Application Priority Data

Nov. 30, 1979 [JP] Japan .................................. 54-155117

[51] Int. Cl.$^3$ ................................................ G03C 1/52
[52] U.S. Cl. ..................................... 430/338; 430/340; 428/913; 428/914; 428/411; 428/537; 282/27.5; 549/265
[58] Field of Search ............... 430/338, 340; 428/913, 428/411, 914, 537, 207; 106/21; 252/500; 346/135.1; 260/343.3 R; 282/27.5; 427/150, 151, 261

[56] References Cited

U.S. PATENT DOCUMENTS

| | | | |
|---|---|---|---|
| 3,825,432 | 7/1974 | Futaku et al. | 106/21 |
| 4,097,288 | 6/1978 | Lawton | 106/21 |
| 4,219,220 | 8/1980 | Oda et al. | 282/27.5 |

FOREIGN PATENT DOCUMENTS 54-104352  8/1979  Japan .................................. 282/27.5

*Primary Examiner*—Won H. Louie, Jr.
*Attorney, Agent, or Firm*—Sughrue, Mion, Zinn, Macpeak and Seas

[57] ABSTRACT

Recording members having excellent light resistance are obtained by using as a dye precursor specific diarylaminofluoran compounds.

19 Claims, No Drawings

IMAGE RECORDING MEMBERS

BACKGROUND OF THE INVENTION

This invention relates to recording members and more particularly to pressure-sensitive recording members, heat-sensitive recording members, electricity-sensitive recording members and light-sensitive recording members which are capable of providing color images having excellent light fastness.

Although a number of recording methods utilizing energy such as pressure, heat, light and electricity have heretofore been proposed, an extremely limited number of methods have been put in practical use. Generally in such recording methods using pressure-sensitive copying paper, heat-sensitive recording paper, or electricity-sensitive recording paper which are presently in practical use, the phenomenon utilized is that when an electron donor substance, dye precursor (which is also called "a color former", and which is a substantially colorless compound forming color on reacting with an electron acceptor substance) and an electron acceptor substance (which is also called "a developer" and an acidic substance, exemplified by clay minerals such as activated clay, phenols, organic carboxylic acids or the metal salts thereof) are brought in contact with each other with application of pressure, heat, and/or electricity, they undergo a chemical reaction and form colored substances.

As a light-sensitive recording sheet, a silver salt light-sensitive member and a diazo light-sensitive paper are well known. Light-sensitive recording sheets, however, of the type that the above-described dye precursor is used in combination with a compound which releases an electron acceptor substance by application of light have been proposed and disclosed, for example, in Japanese Patent Publication Nos. 24188/63, 10550/70, 13258/70, 6212/74, and 28449/74, and Japanese Patent Application (OPI) Nos. 80120/75 and 126228/75 (The term "OPI" as used herein refers to a "published unexamined Japanese patent application").

Dye precursors for use in recording members which form color on coming in contact with electron acceptor substances are required to meet with a number of requirements. Some of the major properties are as follows: (1) they are substantially colorless compounds, (2) they form deep color almost instantaneously on coming into contact with electron acceptor substances, (3) they are easily soluble in certain organic solvents, (4) they have no sublimation properties, (5) they are free from decomposition or coloring due to light, heat, moisture, etc., during the storage thereof, (6) formed color images are fast to light, heat, moisture, chemicals, etc., (7) they are not toxic and cause no environmental pollutions, and (8) they can commercially be produced at low costs.

However, no dye precursors forming blue or black color which meet with all the requirements have been known. Thus, color formers are presently used in admixtures comprising two or more thereof or in combination with suitable electron acceptor substances. For example, Crystal Violet Lactone, having the structure (A) as shown below, and which is presently in practical use as a blue color former, fails to satisfy property (6), although it does satisfy properties (2) and (5). It is, therefore, used in combination with N-Leucobenzoylmethylene Blue having the structure (B) as shown below which does satisfy property (6) although it does not satisfy properties (2) and (5). These methods, however, suffer from the disadvantages that Crystal Violet Lactone and N-Leucobenzoylmethylene Blue have different color formation hues, and when exposed to light before dye formation, become colored.

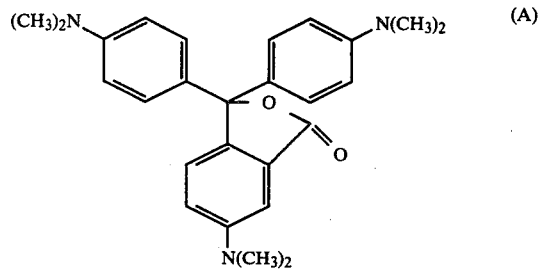

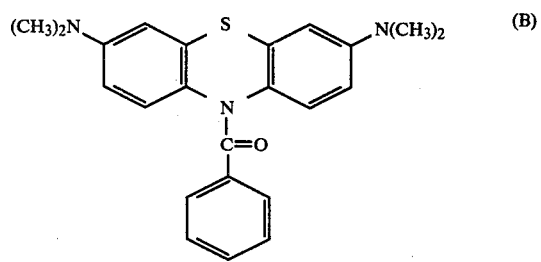

Fluoran based color formers having the structure (C) as shown below which can be practically used as red or black color formers, when used in combination with activated clay as an electron acceptor substance, provide color images which are high in color intensity, but low in light resistance. On the other hand, when a phenol resin is used as the electron acceptor substance, the color intensity is low although the light fastness is improved.

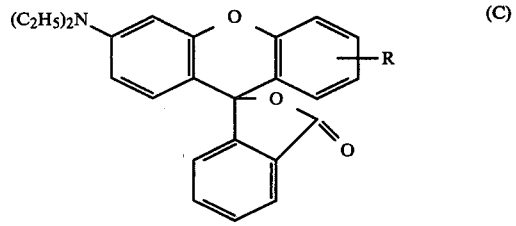

As described above, the conventional color formers have various disadvantages, and have constituted a major obstacle to improvements in the performance of image recording members such as pressure-sensitive copying paper, etc.

SUMMARY OF THE INVENTION

An object of this invention is to provide dye precursors for use in recording members, which does satisfy the above described properties.

Another object of this invention is to provide recording members having excellent performance in which such dye precursors are used.

These objects are attained by using as a dye precursors diarylaminofluoran compounds represented by the formula (I)

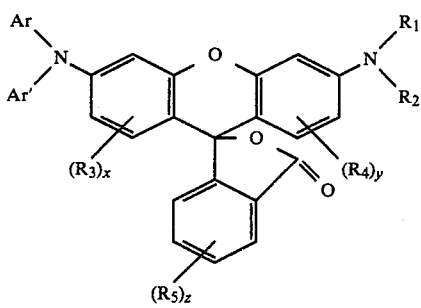

wherein

Ar and Ar' (which may be the same or different) can each represent an aryl group or a heterocyclic ring, or Ar and Ar' together can form a heterocyclic ring;

$R_1$ and $R_2$ (which may be the same or different) can each represent hydrogen, an alkyl group, a cycloalkyl group, an aralkyl group, an aryl group or a heterocyclic ring, or together can form a heterocyclic ring;

$R_3$, $R_4$ and $R_5$ (which may be the same or different) can each represent an alkyl group, an alkoxy group, a halogen atom, a nitro group, an amino group, an alkylamino group, a dialkylamino group or an acylamino group;

x and y are each 0 or an integer of from 1 to 3; and z is 0 or an integer of from 1 to 4.

DETAILED DESCRIPTION OF THE INVENTION

In the formula (I), the aryl group indicated by Ar or Ar' may have one or more substituents. Examples of such substituents are an alkyl group, an alkoxy group, a halogen atom and the like. These alkyl and alkoxy groups preferably have a total number of carbon atoms of 10 or less. Preferred examples of the aryl group indicated by Ar or Ar' include a phenyl group, an alkyl-substituted phenyl group, an alkoxy-substituted phenyl group, a halogen-substituted phenyl group, a naphthyl group, an alkyl-substituted naphthyl group, a halogen-substituted naphthyl group, and an alkoxy-substituted naphthyl group.

Examples of heterocyclic rings represented by Ar or Ar' in the formula (I) include a furyl group, a pyrrolyl group, a thienyl group, an indolyl group, a carbazolyl group, a phenoxazinyl group, a phenothiazinyl group, a phenazinyl group, etc., which can be represented by the formulae

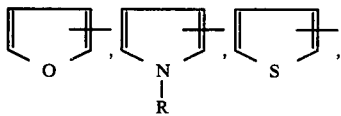

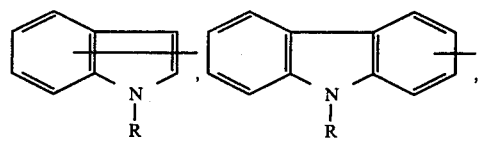

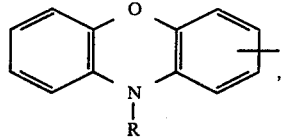

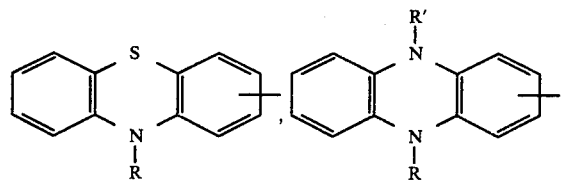

wherein R and R' are each hydrogen or an alkyl group.

Examples of heterocyclic rings that can be formed by the linking of Ar and Ar' together include a carbazole, a phenoxazine, a phenothiazine, a phenazine, etc., which can be represented by the formulae wherein R is an alkyl group.

The substituent indicated by $R_1$ or $R_2$ in the formula (I) represents hydrogen, an alkyl group, a cycloalkyl group, an aralkyl group, an aryl group or a heterocyclic ring. Of these groups, the aryl group and heterocyclic ring are particularly preferred. Particularly preferred examples of these aryl groups and heterocyclic ring are the same as described for the above-described Ar or Ar', such as phenyl group, an alkyl-substituted phenyl group, an alkoxy-substituted phenyl group, a halogen-substituted phenyl group, a naphthyl group, an alkyl-substituted naphthyl group, a halogen-substituted naphthyl group, an alkoxy-substituted naphthyl group, a furyl group, a pyrrolyl group, a thienyl group, an indolyl group, a carbazolyl group, a phenoxazinyl group, a phenothiazinyl group, a phenazinyl group, etc.

The substituents $R_3$, $R_4$, and $R_5$ in the formula (I) can represent an alkyl group, an alkoxy group, a halogen atom, a nitro group, an amino group, an alkylamino group, a dialkylamino group or an acylamino group. Of these groups, an alkyl group containing 4 or less carbon atoms, an alkoxy group containing 4 or less carbon atoms, and a halogen atom are preferred.

In the formula (I), x and y are each 0 or an integer of from 1 to 3, and it is particularly preferred that both x and y are 0.

The diarylaminofluoran derivatives of this invention are novel compounds, and they are generally colorless or pale crystals, which, when contacted with electron acceptor substances, quickly form a red-violet to green-blue colored dye. These colored dyes are very stable as compared with dyes produced from conventional color formers and are subject to almost no discoloration or fading due to irradiation of light, heating and moisture, even when applied for a long period of time. Therefore, they are especially advantageous from the viewpoint of the storage of records for long periods of time.

Furthermore, the colored dyes are rarely subject to discoloration even if they are brought in contact with chemicals or the steam of organic solvents such as alcohols, cellosolves, etc. The effect based upon these characteristics is significantly exhibited when they are used in combination with, as a developer, phenolic organic compounds such as a phenol-formaldehyde resin, bisphenol A, salicyclic acid derivatives, or the metal salts thereof.

Moreover, the diarylaminofluoran derivatives of this invention are excellent in the stability before reacting to form a colored dye, and even after being stored for long periods of time, they are not subject to discoloration or fading, and exhibit sufficient coloring capability. Thus, they are almost ideal as a color former for use in recording members such as pressure-sensitive copying paper, etc.

Representative examples of the diarylaminofluoran compounds of this invention are shown below, but this invention is not limited thereto.

(1) 3-diphenylamino-6-diethylaminofluoran, (2) 3-diphenylamino-6-piperidinofluoran, (3) 3-diphenylamino-6-(N-methyl-N-phenyl)aminofluoran, (4) 3-diphenylamino-6-(N-ethyl-N-tolyl)aminofluoran, (5) 3,6-bis-diphenylaminofluoran, (6) 3-diphenylamino-6-ditolylaminofluoran, (7) 3-diphenylamino-6-(N-phenyl-N-tolyl) aminofluoran, (8) 3-diphenylamino-6-(N-phenyl-N-β-naphthyl)-aminofluoran, (9) 3-ditolylamino-6-diethylaminofluoran, (10) 3-ditolylamino-6-(N-ethyl-N-tolyl)aminofluoran, (11) 3,6-bis-ditolylaminofluoran, (12) 3-ditolylamino-6-(N-phenyl-N-tolyl)aminofluoran, (13) 3-ditolylamino-6-(N-phenyl-N-β-naphthyl)aminofluoran, (14) 3-(N-phenyl-N-tolyl)amino-6-diethylaminofluoran, (15) 3,6-bis(N-phenyl-N-tolyl)aminofluoran, (16) 3-(N-phenyl-N-tolyl-)amino-6-(N-phenyl-N-β-naphthyl)aminofluoran, (17) 3-diphenylamino-6-dianisylaminofluoran, (18) 3-ditolylamino-6-dianisylaminofluoran, (19) 3,6-bis-dianisylaminofluoran, (20) 3,6-bis-(N-phenyl-N-methoxyphenyl)aminofluoran, (21) 3-diphenylamino-6-[di(p-chloro)amino]fluoran, (22) 3,6-bis-[di(p-chlorophenyl)amino]fluoran, (23) 3,6-bis(N-phenyl-N-β-naphthyl)aminofluoran, (24) 3-(9-carbazolyl)-6-diethylaminofluoran, (25) 3-(9-carbazolyl)-6-(N-ethyl-N-tolyl)aminofluoran, (26) 3-(10-phenothiazinyl)-6-diethylaminofluoran, (27) 3-(10-phenothiazinyl)-6-(N-ethyl-N-tolyl)aminofluoran, etc. The structural formulae of these compounds are shown in Table 1.

TABLE 1

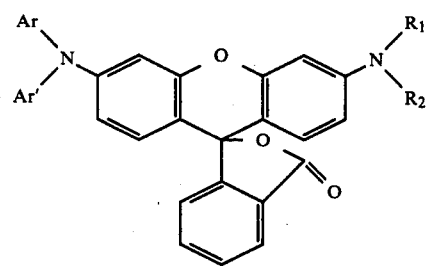

TABLE 1-continued

Formula:

(Compound 5: xanthene-phthalide structure with Ar,Ar'N- on one side and R₁R₂N- on the other)

(Compound 10: xanthene-phthalide structure with Ar,Ar'N- on one side and R₁R₂N- on the other)

| Compound No. | Ar,Ar'N- | R₁,R₂N- |
|---|---|---|
| (9) | di(4-CH₃-phenyl)N- | (C₂H₅)₂N- |
| (10) | di(4-CH₃-phenyl)N- | N-ethyl-N-(4-CH₃-phenyl)- (C₂H₅, CH₃-C₆H₄) |
| (11) | di(4-CH₃-phenyl)N- | di(4-CH₃-phenyl)N- |
| (12) | di(4-CH₃-phenyl)N- | N-phenyl-N-(4-CH₃-phenyl)- |
| (13) | di(4-CH₃-phenyl)N- | N-phenyl-N-naphthyl- |
| (14) | N-phenyl-N-(4-CH₃-phenyl)- | (C₂H₅)₂N- |
| (15) | N-phenyl-N-(4-CH₃-phenyl)- | N-phenyl-N-(4-CH₃-phenyl)- |
| (16) | N-phenyl-N-(4-CH₃-phenyl)- | N-phenyl-N-(2-naphthyl)- |
| (17) | diphenylN- | di(4-CH₃O-phenyl)N- |
| (18) | di(4-CH₃-phenyl)N- | di(4-CH₃O-phenyl)N- |
| (19) | di(4-CH₃O-phenyl)N- | di(4-CH₃O-phenyl)N- |
| (20) | N-phenyl-N-(4-CH₃O-phenyl)- | N-phenyl-N-(4-CH₃O-phenyl)- |
| (21) | diphenylN- | di(4-Cl-phenyl)N- |
| (22) | di(4-Cl-phenyl)N- | di(4-Cl-phenyl)N- |
| (23) | N-phenyl-N-(1-naphthyl)- | N-phenyl-N-(2-naphthyl)- |

TABLE 1-continued

Formula:

[Structure showing Ar, Ar' — N — [xanthene/fluoran core with central O] — N — R1, R2 with lactone group]

| Compound No. | Ar<br>N—<br>Ar' | R1<br>N—<br>R2 |
|---|---|---|
| (24) | carbazol-9-yl | (C₂H₅)₂N— |
| (25) | carbazol-9-yl | CH₃—⟨C₆H₄⟩—N(C₂H₅)— |
| (26) | phenothiazin-10-yl | (C₂H₅)₂N— |
| (27) | phenothiazin-10-yl | CH₃—⟨C₆H₄⟩—N(C₂H₅)— |

These diarylaminofluoran derivatives form red-violet to green-blue dyes on coming in contact with electron acceptor substances. Compounds which can desirably be used in blue-color-forming pressure-sensitive copying paper, which is a preferred type of image recording member according to the invention, are Compounds (3), (4), (5), (6), (7), (8), (10), (11), (12), (13), (15), (16), (17), (18), (19), (20), (21), (22) and (23) Of these compounds, Compounds (5), (6), (11), (15), (17), (18), (19), (21), (22) and (23) are particularly preferred from an economic viewpoint.

A method of synthesizing the diarylaminofluoran derivatives of this invention will hereinafter be explained. The diarylaminofluoran derivatives of this invention can be prepared by the following reaction schemes:

Reaction Scheme A:

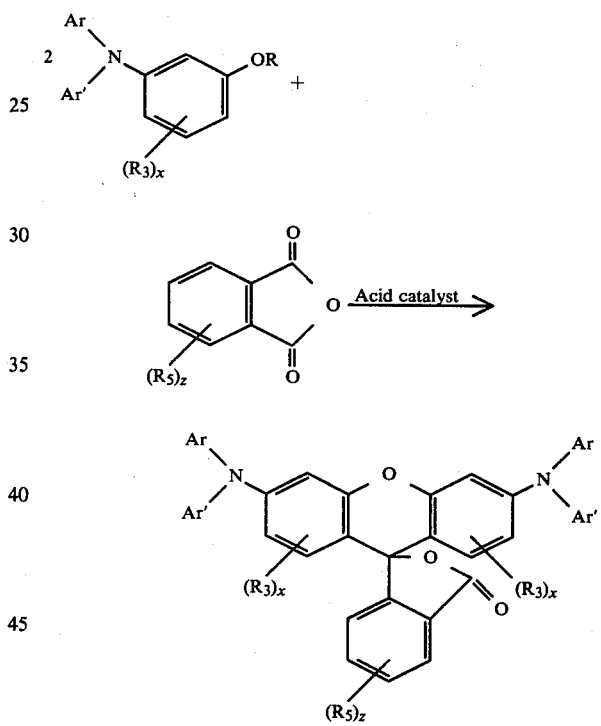

Reaction Scheme B:

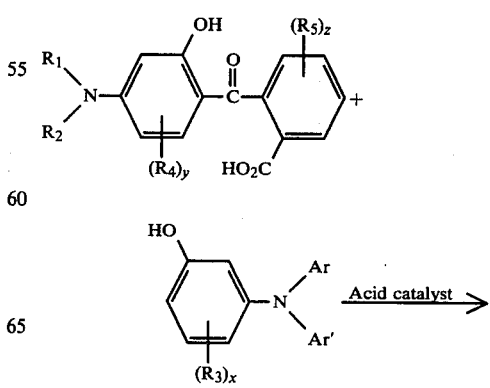

-continued

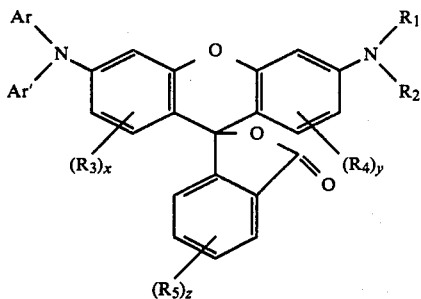

wherein R is H, —CH$_3$, —C(=O)—CH$_3$, —SO$_2$CH$_3$,

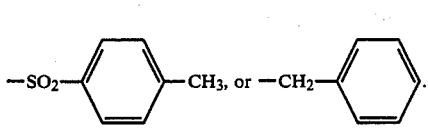

Reaction Scheme A is a method for obtaining symmetrical bis-diarylaminofluoran derivatives, and the desired products can easily be obtained by reacting by heating triarylamine derivatives and phthalic anhydride derivatives in the presence of an acid catalyst.

Reaction Scheme B is a method for obtaining non-symmetrical diarylaminofluoran derivatives, and they are obtained by reacting benzoylbenzoic acid derivatives and triarylamine derivatives in the presence of an acid catalyst.

Acid catalysts which are used in the above reactions include Lewis acids such as zinc chloride, aluminum chloride, magnesium chloride, etc., and Bransted acids such as sulfuric acid, p-toluenesulfonic acid, methanesulfonic acid, etc.

Symmetrical bis-diarylaminofluoran derivatives can also be synthesized by Reaction Scheme C, but this scheme is inferior in yield to Scheme A.

Reaction Scheme C:

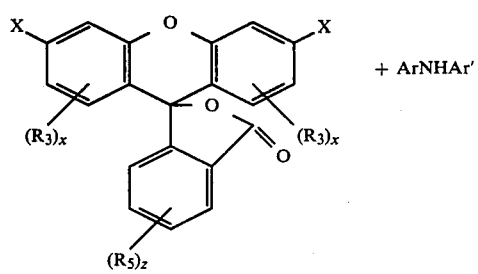

(wherein X is Cl, Br or NEt$_2$)

-continued

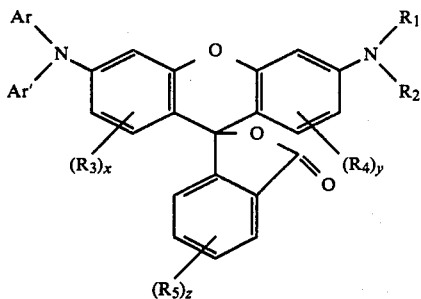

Hereinafter, representative methods of preparing the diarylaminofluoran compounds of this invention are shown.

SYNTHESIS EXAMPLE 1

Preparation of 3,6-Bis-diphenylaminofluoran [Compound (5)]

A mixture of 33.8 g (0.2 mol) of diphenylamine, 22 g (0.2 mol) of resorcin and 5 g of 85% phosphoric acid was stirred while heating at 240° C. for 5 hours in an atmosphere of nitrogen. The mixture was allowed to cool down and, thereafter, it was heated together with an aqueous solution of sodium hydroxide and rendered acidic by adding hydrochloric acid. The resulting product was then extracted with ethyl acetate. From the extract, the ethyl acetate was distilled off under reduced pressure. The residue obtained was processed by column chromatography to obtain 11 g of m-hydroxytriphenylamine.

A mixture of 5.22 g (0.02 mol) of m-hydroxytriphenylamine, 1.48 g (0.01 mol) of phthalic anhydride and 5.5 g of anhydrous zinc chloride was melted by heating at 150° C. for 3 hours. After allowing the mixture to cool down, an aqueous solution of sodium hydroxide was added thereto and the resulting product was then extracted with ethyl acetate. From the extract, the ethyl acetate was distilled off under reduced pressure. The residue obtained was recrystallized from benzene/hexane to obtain 4.4 g of 3,6-bis-diphenylaminofluoran, m.p. 161°–174° C.

SYNTHESIS EXAMPLE 2

Preparation of 3-Diphenylamino-6-(N-ethyl-N-p-tolyl)-aminofluoran [Compound (4)]

A mixture of 7.5 g (0.02 mol) of 2-[2-hydroxy-4-(N-ethyl-N-p-tolyl)amino]benzoylbenzoic acid, 5.22 g (0.02 mol) of m-hydroxytriphenylamine and 30 ml of methanesulfonic acid was stirred at 50° C. for 2 hours. The mixture was allowed to cool down and then poured into water. The resulting solution was neutralized with sodium hydroxide and extracted with ethyl acetate. The solvent, ethyl acetate, was distilled off from the extract and, thereafter, the residue obtained was recrystallized from benzene/hexane to obtain 10.4 g of 3-diphenylamino-6-(N-ethyl-N-tolyl)aminofluoran, m.p. 155°–165° C.

SYNTHESIS EXAMPLE 3

Preparation of
3,6-Bis-(N-phenyl-N-β-naphthyl)aminofluoran
[Compound (23)]

A mixture of 43.8 g (0.2 mol) of phenyl-β-naphthylamine, 46.8 g (0.2 mol) of m-iodoanisol, 27.6 g (0.2 mol) of anhydrous potassium carbonate, 2 g of copper powder and 300 ml of nitrobenzene was heated under reflux for 15 hours. The inorganic substances were filtered off and the nitrobenzene was distilled off. The residue obtained was then processed by column chromatography to obtain 43.8 g of phenyl-β-naphthyl-3-methoxyphenylamine.

The thus-obtained phenyl-β-naphthyl-3-methoxyphenylamine was dissolved in 250 ml of toluene, and 25 g of anhydrous aluminum chloride was added thereto. The resulting mixture was heated under reflux for 2 hours. After being allowed to cool down, the reaction liquor was poured into ice water and then rendered acidic by adding hydrochloric acid. The organic phase thus-obtained was separated and the toluene was concentrated under reduced pressure. Crystals precipitated were collected by filtration to obtain 24 g of phenyl-β-naphthyl-3-hydroxyphenylamine.

To 10 ml of xylene, 4.5 g of the above-prepared amine, 1.1 g of phthalic anhydride and 5 g of p-toluenesulfonic acid (monohydrate) were added, and the resulting mixture was heated under reflux for 2 hours. After being allowed to cool down, the reaction liquor was rendered alkaline by adding an aqueous solution of sodium hydroxide and, thereafter, the organic phase was separated and the xylene was concentrated under reduced pressure. N-hexane was added to cause crystallization, and the crystals obtained were collected by filtration to obtain 3.4 g of 3,6-bis(N-phenyl-N-β-naphthyl)aminofluoran, m.p. 230°–260° C.

SYNTHESIS EXAMPLE 4

Preparation of 3,6-Bis-ditolylaminofluoran [Compound (11)]

In the same manner as in Synthesis Example 1, except that di-p-tolylamine was used in place of diphenylamine, di-p-tolyl-3-hydroxyphenylamine was obtained. A mixture of 1.4 g of the above-obtained amine, 0.36 g of phthalic anhydride, 5 g of methanesulfonic acid and 5 ml of xylene was heated under reflux for 2 hours. After being allowed to cool down, the reaction liquor was rendered alkaline by adding an aqueous solution of sodium hydroxide. Thereafter, the organic phase was separated and methanol was added thereto to cause crystallization. The crystals obtained were collected by filtration, to obtain 1.0 g of 3,6-bis-di-p-tolylaminofluoran, m.p. >300° C.

SYNTHESIS EXAMPLE 5

Preparation of
3-(10-phenothiazinyl)-6-diethylaminofluoran
[Compound (26)]

In the same manner as in Synthesis Example 3 except that phenothiazine was used in place of phenyl-β-naphthylamine, the reaction was performed and, thereafter, demethylation was carried out with aluminum chloride to obtain 3-(10-phenothiazinyl)phenol. The thus-obtained 3-(10-phenothiazinyl)phenol was condensed with 2-(2-hydroxy-4-diethylamino)benzoylbenzoic acid in the same manner as in Synthesis Example 2 to obtain 3-(10-phenothiazinyl)-6-diethylaminofluoran, m.p. 170°–210° C.

SYNTHESIS EXAMPLE 6

Preparation of 3-Diphenylamino-6-ditolylaminofluoran [Compound (6)]

To a mixture of 26.1 g (0.1 mol) of m-hydroxytriphenylamine, 14.8 g (0.1 mol) of phthalic anhydride and 300 ml of nitrobenzene was added 40 g of anhydrous aluminum chloride, and the resulting mixture was stirred while heating at 100° C. for 6 hours. After being allowed to cool, the reaction liquor was poured into cold dilute hydrochloric acid, and the nitrobenzene was distilled off by steam distillation. The residue obtained was crystallized out of the solution by adding ether to obtain 13 g of 2-(2-hydroxy-4-diphenylamino)benzoylbenzoic acid, m.p. 210°–213° C.

The thus-obtained benzoylbenzoic acid and di-p-tolyl-3-hydroxyphenylamine were condensed by the same method as used in Synthesis Example 2 to obtain 3-diphenylamino-6-ditolylaminofluoran, m.p. 164°–175° C.

The colored hues on activated caly obtained using some typical diarylaminofluoran compounds according to the invention, i.e., the colored hue obtained by dissolving the typical diarylaminofluoran compound of the invention to the solvents such as toluene, benzene, etc., and then bring the resulting solution into contact with a sheet of paper coated with an active clay, are shown in Table 2. The activated clay is generally materials obtained by treating a clay mineral such as montmorillonites with acids and alkalis.

TABLE 2

Formula:

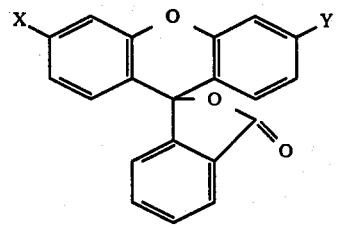

| Compound No. | X | Y | m.p. (°C.) | Colored Hue on Activated Clay |
|---|---|---|---|---|
| (1) | 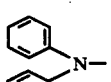 | (C₂H₅)₂N— | 164–175 | red-violet |
| (4) | 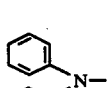 | 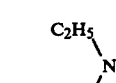 | 155–165 | blue-violet |
| (5) | 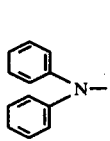 | 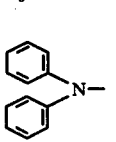 | 161–174 | violet-blue |

TABLE 2-continued

Formula:

| Compound No. | X | Y | m.p. (°C.) | Colored Hue on Activated Clay |
|---|---|---|---|---|
| (6) | (diphenylamino) | 4-methyl-N-(4-methylphenyl)amino (H₃C-C₆H₄-N-C₆H₄-CH₃) | 164–175 | blue |
| (11) | bis(4-methylphenyl)amino | bis(4-methylphenyl)amino | >300 | blue |
| (23) | di(2-naphthyl)amino | di(2-naphthyl)amino | 230–260 | blue |
| (24) | 2,2'-biphenylylene-N— | (C₂H₅)₂N— | 145–158 | light violet-red |
| (25) | 2,2'-biphenylylene-N— | N(C₂H₅)(4-CH₃-C₆H₄)— | 62–100 | light blue-violet |

TABLE 2-continued

Formula:

| Compound No. | X | Y | m.p. (°C.) | Colored Hue on Activated Clay |
|---|---|---|---|---|
| (26) | phenothiazin-10-yl | (C₂H₅)₂N— | 170–210 | violet-red |

Hereinafter, a method of preparing an image recording member according to this invention will be explained by reference to a typical production process.

A pressure-sensitive copying paper according to this invention may be in any form as described in U.S. Pat. Nos. 2,505,470, 2,505,471, 2,505,489, 2,548,366, 2,712,507, 2,730,456, 2,730,457, 3,418,250. More particularly, the above-described color formers are dissolved, singly or in admixtures comprising two or more thereof, or in combination with other color formers, in a solvent (for example, synthetic oils such as alkylated naphthalene, alkylated diphenyl, alkylated diphenylmethane, alkylated terphenyl, etc., vegetable oils such as cotton oil, castor oil, etc., animal oils, mineral oils or mixtures thereof), dispersed in a binder or microencapsulated, and then coated on a support such as paper, a plastic sheet, a resin-coated paper, etc., to obtain the corresponding pressure-sensitive copying papers.

The amount of the color former used varies depending upon the desired thickness of the coated color former, the shape of the pressure-sensitive copying paper, the method of preparing capsules, and other conditions and, therefore, it is suitably selected taking such conditions into account. One skilled in the art can easily determine an appropriate amount of the color former used.

In encapsulating the color formers, the method utilizing the coacervation of hydrophilic colloid sol as described in U.S. Pat. Nos. 2,800,457 and 2,800,458, the interfacial polymerization method as described in British Pat. Nos. 867,797, 950,443 and 1,091,076, etc., can be used.

Hereinafter, a typical method of preparing the heat-sensitive recording paper of this invention will be explained.

A nearly colorless dye precursor, an electron acceptor substance and, optionally, a heat-meltable substance (which is used when the dye precursor and electron acceptor substance do not melt at desired temperatures) are sufficiently finely pulverized and mixed with a solution prepared by dissolving or dispersing a binder in a solvent or dispersing medium. The resulting mixed solution is then coated on a support, such as paper, a plastic sheet, a resin-coated paper, etc., to obtain the heat-sensitive recording paper. In preparing the above mixed solution, all of the ingredients may be mixed at the same time and pulverized, or separately pulverized in suitable combinations and dispersed, and then mixed.

The mixed coating solution may be soaked into paper.

Furthermore, in preparing the mixed coating solution, an opacifying agent may be added and mixed.

The amount of each component constituting the heat-sensitive recording paper is as follows: dye precursor, 1 to 2 parts by weight; electron acceptor substance, 1 to 6 parts by weight; heat-meltable substance, 0 to 30 parts by weight; binder, 1 to 15 parts by weight; and dispersing medium (solvent), 20 to 300 parts by weight.

As the dye precursor, the diarylaminofluoran derivatives of this invention may be used alone or in combination with each other, or may be used in combination with compounds known as color formers for pressure-sensitive copying paper, such as known Crystal Violet Lactone, fluoran derivatives, etc. As the electron acceptor substance, of the substances as described hereinbefore, the organic acids or the metal salts thereof are particularly preferred.

The dispersing medium (solvent) need not almost dissolve both the dye precursor and electron acceptor substance. If it dissolves at least one of them, color will be formed.

Therefore, dispersing media (solvents) which can be used include water and hydrocarbons such as hexane, ligroin, petroleum ether, etc. Of these compounds, water is most desirable.

Examples of binders which can be used in this invention include a styrene-butadiene copolymer, an alkyd resin, polybutyl methacrylate, a vinyl chloride-vinyl acetate copolymer, a styrene-maleic anhydride copolymer, synthetic rubber, gum arabic, polyvinyl alcohol, hydroxyethyl cellulose, and the like. In particular, water-soluble binders such as gum arabic, polyvinyl alcohol, hydroxymethyl cellulose, etc., are desirable from the viewpoint of the relation with the dispersing medium (solvent).

Heat-meltable substances which can be used in this invention include stearic acid amide, erucamide, oleic amide, ethylenebisstearoamide, benzoin, $\alpha$-naphthol, $\beta$-naphthol, p-tert-butylphenol, para-phenylphenol, 4,4'-cyclohexylidenediphenol, 4,4'-isopropylidenediphenol, phthalic anhydride, maleic anhydride, stearic acid, erucic acid, palmitic acid, para-hydroxybenzoic acid methyl ester, phthalic acid diphenyl ester, triphenyl phosphate, para-hydroxy diphenyl ether, 2,2-bis[4-($\beta$-hydroxyethoxy)phenyl]propane, para-bis($\beta$-hydroxyethoxy)-benzene, etc.

These substances are colorless or light-colored solids at ordinary temperature and have sharp melting points at temperatures which are suitable for heating for copying, i.e., in the vicinity of from 50° C. to 180° C. In a molten state, they dissolve at least one of the above-described dye precursor and electron acceptor substance, and desirably both of them.

Opacifying agents which can be used in this invention include titanium oxide, zinc oxide, barium sulfate, calcium sulfate, starch and the like.

In producing an electricity-sensitive recording paper according to this invention, an electrically conductive substance, as described, for example, in Japanese Patent Application (OPI) Nos. 11344/74 and 48930/75, wherein a dye precursor and an electron acceptor substance are dispersed together with a binder in a dispersing medium in which the dye precursor and electron acceptor substance are substantially insoluble, such as water, and coated on a support, such as paper, etc., or an electrically conductive substance is coated on the support to form an electrically conductive layer and a solution prepared by dispersing in water the dye precursor and electron acceptor substance together with the binder is coated on the electrically conductive layer. If both the dye precursor and electron acceptor substance do not melt at preferred temperatures (in general, 70° C. to 120° C.), the sensitivity to Joule's heat generated by application of electricity can be regulated by adding a heat-meltable substance which melts in the preferred temperature range and dissolves at least one of the dye precursor and the electron acceptor substance.

As the electron acceptor substance and heat-meltable substance, the same as are already known for production of the heat-sensitive recording paper can be used.

By using the diarylaminofluoran derivatives of this invention in place of dye precursors such as lactone compounds, lactam compounds, spiropyran compounds, carbinol compounds, ethylene compounds, leucoauramine compounds, oxazine compounds, etc., as described in Japanese Patent Publication Nos. 24188/63, 10550/70, 13258/70, 204/74, 6212/74, 28449/74, Japanese Patent Application (OPI) Nos. 31615/72, 32532/73, 9227/74, 135617/74, 80120/75, 87317/75, 126228/75, etc., the light-sensitive recording sheets of this invention can be produced.

Other recording members can be produced by using the diarylaminofluoran compounds of this invention in place of the conventional dye precursors.

The following examples and comparative example are provided to illustrate this invention in greater detail.

EXAMPLE 1

In 30 parts (by weight; hereinafter all parts are by weight) of alkylated naphthalene was dissolved 1 part of a color former of this invention, i.e., Compound (5) as shown in Table 1. The solution so obtained was added with vigorous stirring to 50 parts of water with 6 parts of gelatin and 4 parts of gum arabic dissolved therein and emulsified therein to obtain oil droplets having a diameter of from 1 to 10$\mu$. To this emulsion was added 250 parts of water. By gradually adding small portions of acetic acid, the pH was adjusted to about 4 to cause coacervation whereby walls of gelatin and gum arabic were formed on the oil droplets. After addition of formalin, the pH was raised to 9 to harden the walls.

The thus-obtained microcapsule dispersion was coated on a sheet of paper and dried. This paper was brought into contact with a sheet of paper coated with each of acidic clays (activated clay, acidic clay, attapulgite), a phenol resin, 4,4'-isopropylidenediphenol, zinc 3,5-bis($\alpha$-methylbenzyl)salicylinate, zinc p-toluenesulfonate, and 2,2'-methylenebisphenol, and upon application of pressure or impulse on the papers, a blue image was obtained instantaneously. This image was of high intensity and was excellent in light fastness and heat resistance.

EXAMPLE 2

A microcapsule-coated paper was prepared in the same manner as in Example 1 except that Compound (11) of Table 1 was used as a color former in place of the color former used in Example 1. Thus, an excellent pressure-sensitive copying paper was obtained which formed color of high intensity, and the colored letters were excellent in light fastness and heat resistance.

COMPARATIVE EXAMPLE

In the same manner as in Example 1, except that Crystal Violet Lactone was used in place of the color former used in Example 1, a microcapsule-coated paper was prepared. This microcapsule-coated paper was brought into contact with an activated clay-coated paper, and on application of letter impulse by use of a typewriter, the corresponding blue letter image was obtained. When the letter image was exposed to a xenon lamp for 3 hours, the blue letter image markedly faded and could be read only with difficulty.

With some of the color formers of this invention, the light fastness was tested in the same manner as described above. The results are shown in Table 3. The light fastness value is indicated by the color image residual ratio after irradiation with a xenon lamp of 32,000 lux for 6 hours.

TABLE 3

| Color Former | Intensity of Formed Color (refractive density after typing) | Light Fastness of Colored Image (%) |
| --- | --- | --- |
| Crystal Violet Lactone (comparison) | 0.87 | 20 |
| Compound (1) (this invention) | 0.88 | 70 |
| Compound (3) (this invention) | 0.90 | 82 |
| Compound (4) (this invention) | 0.89 | 72 |
| Compound (5) (this invention) | 0.89 | 79 |
| Compound (23) (this invention) | 0.85 | 68 |
| Compound (6) (this invention) | 0.89 | 80 |
| Compound (11) (this invention) | 0.87 | 80 |

From the above results, it is apparent that the color formers of this invention provide color images having excellent light fastness.

EXAMPLE 3

Thirty parts of a color former of this invention (Compound (6) of Table 1) was mixed with 150 parts of a 10% aqueous solution of polyvinyl alcohol and 70 parts of water and pulverized for 2 hours to prepare a dispersion. The particle diameter after the pulverization was about 5 microns. This dispersion is designated as "Component A".

On the other hand, 30 parts of bisphenol A (4,4'-isopropylidenediphenol), 30 parts of acetone, 150 parts of a 10% aqueous solution of polyvinyl alcohol and 55 parts of water were mixed and pulverized for 2 hours to prepare a dispersion. The particle size of insoluble substances after the pulverization was about 5 microns. This dispersion is designated as "Component B".

Thereafter, 5 parts of Component A and 40 parts of Component B were mixed, coated on a sheet of paper and dried to obtain a heat-sensitive recording paper.

On applying heat by use of a heat pen, the heat-sensitive recording paper formed a blue color. When the heat-sensitive recording paper was superposed on an original and heated in a heat-sensitive copying machine, a blue copied image was obtained. The thus obtained image was of high stability against light; even though the image was exposed to an ultraviolet lamp for 1 hour, there was observed no change in both the hue and intensity.

EXAMPLE 4

A mixture of 200 parts of a 1% by weight aqueous solution of polyvinyl alcohol (PVA 117, produced by Kuraray Co., Ltd.) and 200 parts of cuprous iodide was pulverized in a ball mill for 24 hours to obtain a dispersion. This dispersion was coated on an art paper (i.e., so-called a paper on which an inorganic pigment such as $BaSO_4$, etc., is coated) with a wire bar and dried to form an electrically conductive layer.

Thereafter, 35 parts of a color former of this invention (Compound (4) of Table 1) was added as a dye precursor to 400 parts of a 10% by weight aqueous solution of polyvinyl alcohol, and furthermore 35 parts of 4,4'-isopropylidenediphenol was added as an electron acceptor substance. The resulting mixture was pulverized in a ball mill for 24 hours to obtain a nearly colorless dispersion. This dispersion was coated on the art paper on which the electrically conductive layer had been provided, by use of a wire bar which was so regulated that the thickness of the coated film be about 8 microns and dried to obtain an electricity-sensitive recording paper.

On scanning on the above-prepared recording paper at a speed of 540 mm/sec a recording needle electrode of a tungsten wire of a diameter of 0.25 mm to which 300 V of AC voltage was applied, a violet-blue record having a refractive intensity of 0.86 was obtained. The light fastness of the above-obtained colored image was about 3 times as much as that of conventional Crystal Violet Lactone color image. Furthermore, in comparison with the prior art recording paper in which 2-anilino-6-diethylamino-3-methylfluoran was used, the present recording paper was excellent in light fastness and fog resistance.

EXAMPLE 5

Five parts of a color former of this invention (Compound (5) of Table 1) was dissolved in 40 ml of chloroform, and 40 ml of a 10% benzene solution of polystyrene was added thereto. After the mixture was well stirred, 5 parts of carbon tetrabromide was added thereto in a dark place to obtain a uniform solution.

The thus-obtained uniform solution was coated on a polyethylene-coated paper in a dark place and dried at room temperature.

On irradiation with ultraviolet rays, the above prepared light-sensitive paper formed a blue color. Thereafter, the image was fixed by washing with n-hexane, and unexposed areas formed no color even though they were exposed to light for a long period of time.

An original drawn on a transparent plastic base was superposed on the above obtained light-sensitive paper and ultraviolet rays were irradiated on the light-sensitive paper through the original whereupon there was obtained a blue image wherein deep-colored and light-colored areas were reversed.

This light-sensitive paper was subject to no fogging before light-exposure and provided a color image having excellent characteristics.

EXAMPLE 6

The procedure of Example 1 as described in each of the prior art methods shown below was followed wherein the diarylaminofluoran derivatives of this invention (Compounds (1), (4), (5) and (6) of Table 1) were used in place of the conventional dye precursors in recording members as described below. As a result, corresponding products having excellent light fastness were obtained.

French Pat. No. 2,120,922: supersonic recording paper

Belgian Pat. No. 7,959,986: electric ray recording member

Japanese Patent Application (OPI) No. 12104/73: light-sensitive printing plate

Japanese Patent Publication No. 10766/72: sealing member

Japanese Patent Application (OPI) No. 3713/74: type ribbon

Japanese Patent Application (OPI) No. 83924/73: ink for ball point pen

U.S. Pat. No. 3,769,045: crayon

While the invention has been described in detail and with reference to specific embodiments thereof, it will be apparent to one skilled in the art that various changes and modifications can be made therein without departing from the spirit and scope thereof.

What is claimed is:

1. An image recording member containing, in combination with a color developing electron acceptor, as a dye precursor a diarylaminofluoran compound represented by the formula (I)

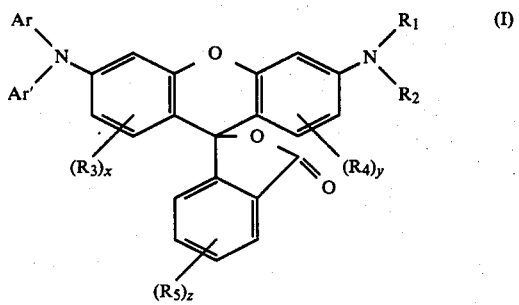

wherein
Ar and Ar' each represent an aryl group or a heterocyclic ring, or Ar and Ar' together can form a heterocyclic ring,
$R_1$ and $R_2$ each represent hydrogen, an alkyl group, a cycloalkyl group, an aralkyl group, an aryl group, or a heterocyclic ring, or $R_1$ and $R_2$ together form a heterocyclic ring,
$R_3$, $R_4$ and $R_5$ each represent an alkyl group, an alkoxy group, a halogen atom, a nitro group, an amino group, an alkylamino group, a dialkylamino group, or an acylamino group,
x and y are each 0 or an integer of from 1 to 3, and z is 0 or an integer of from 1 to 4.

2. An image recording member as in claim 1, wherein Ar and Ar' are selected from a group consisting of a phenyl group, an alkyl-substituted phenyl group, an alkoxy-substituted phenyl group, a halogen-substituted phenyl group, a naphthyl group, an aralkyl-substituted naphthyl group, a halogen-substituted naphthyl group, and an alkoxy-substituted naphthyl group.

3. An image recording member as in claim 2, wherein the alkyl and alkoxy substituent groups have a total number of carbon atoms of 10 or less.

4. An image recording member as in claim 1 wherein Ar and Ar' are heterocyclic rings selected from the group consisting of a furyl group, a pyrrolyl group, a thienyl group, an indolyl group, a carbazolyl group, a phenoxazinyl group, a phenothiazinyl group, and a phenazinyl group.

5. An image recording member as in claim 1, wherein Ar and Ar' together form a heterocyclic ring selected from the group consisting of

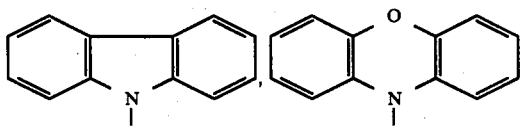

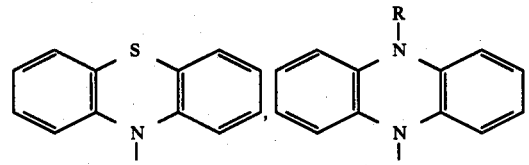

wherein R is an alkyl group.

6. An image recording member as in claim 1, wherein x and y are each 0.

7. An image recording member as in claim 1, wherein the diarylaminofluoran compound is selected from the group consisting of 3-diphenylamino-6-diethylaminofluoran, 3-diphenylamino-6-piperidinofluoran, 3-diphenylamino-6-(N-methyl-N-phenyl)aminofluoran, 3-diphenylamino-6-(N-ethyl-N-tolyl)aminofluoran, 3,6-bis-diphenylaminofluoran, 3-diphenylamino-6-ditolylaminofluoran, 3-diphenylamino-6-(N-phenyl-N-tolyl)aminofluoran, 3-diphenylamino-6-(N-phenyl-N-β-naphthyl)aminofluoran, 3-ditolylamino-6-diethylaminofluoran, 3-ditolylamino-6-(N-ethyl-N-tolyl)aminofluoran, 3,6-bis-ditolylaminofluoran, 3-ditolylamino-6-(N-phenyl-N-tolyl)aminofluoran, 3-ditolylamino-6-(N-phenyl-N-β-naphthyl)aminofluoran, 3-(N-phenyl-N-tolyl)amino-6-diethylaminofluoran, 3,6-bis(N-phenyl-N-tolyl)aminofluoran, 3-(N-phenyl-N-tolyl)-amino-6-(N-phenyl-N-β-naphthyl)aminofluoran, 3-diphenylamino-6-dianisylaminofluoran, 3-ditolylamino-6-dianisylaminofluoran, 3,6-bis-dianisylaminofluoran, 3,6-bis-(N-phenyl-N-methoxyphenyl)aminofluoran, 3-diphenylamino-6-[di(p-chloro)amino]fluoran, 3,6-bis[di(p-chlorophenyl)amino]fluoran, 3,6-bis(N-phenyl-N-β-naphthyl)-aminofluoran, 3-(9-carbazolyl)-6-diethylaminofluoran, 3-(9-carbazolyl)-6-(N-ethyl-N-tolyl)aminofluoran, 3-(10-phenothiazinyl)-6-diethylaminofluoran, 3-(10-phenothiazinyl)-6-(N-ethyl-N-tolyl)aminofluoran.

8. An image recording member as in claim 7, wherein said recording member is a blue-color-forming pressure-sensitive copying paper and wherein the diarylaminofluoran compound is selected from the group consisting of 3-diphenylamino-6-(N-methyl-N-phenyl)aminofluoran, 3-diphenylamino-6-(N-ethyl-N-tolyl)aminofluoran, 3,6-bis-diphenylaminofluoran, 3-diphenylamino-6- ditolylaminofluoran, 3-diphenylamino-6-(N-phenyl-N-tolyl)aminofluoran, 3-diphenylamino-6-(N-phenyl-N-β-naphthyl)aminofluoran, 3-ditolylamino-6-(N-ethyl-N-tolyl)aminofluoran, 3,6-bis-ditolylaminofluoran, 3-ditolylamino-6-(N-phenyl-N-tolyl)aminofluoran, 3-ditolylamino-6-(N-phenyl-N-β-naphthyl)aminofluoran, 3,6-bis(N-phenyl-N-tolyl)aminofluoran, 3-(N-phenyl-N-tolyl)amino-6-(N-phenyl-N-β-naphthyl)aminofluoran, 3-diphenylamino-6-dianisylaminofluoran, 3-ditolylamino-6-dianisylaminofluoran, 3,6-bis-dianisylaminofluoran, 3,6-bis-(N-phenyl-N-methoxyphenyl)aminofluoran, 3-diphenylamino-6-[di(p-chloro)amino]fluoran, 3,6-bis[di(p-chlorophenyl)amino]fluoran, and 3,6-bis(N-phenyl-N-β-naphthyl)aminofluoran.

9. An image recording member as in claim 8, wherein said diarylaminofluoran compound is selected from the group consisting of 3,6-bis-diphenylaminofluoran, 3-diphenylamino-6-ditolylaminofluoran, 3,6-bis-ditolylaminofluoran, 3,6-bis(N-phenyl-N-tolyl)aminofluoran, 3-diphenylamino-6-dianisylaminofluoran, 3-ditolylamino-6-dianisylaminofluoran, 3,6-bis-dianisylaminofluoran, 3-diphenylamino-6-[di(p-chloro)amino]fluoran, 3,6-bis[di-(p-chlorophenyl)amino]fluoran, and 3,6-bis(N-phenyl-N-β-naphthyl)aminofluoran.

10. An image recording member as in claim 1, wherein the recording member is a pressure-sensitive copying paper.

11. An image recording member as in claim 1, wherein said recording member is a heat-sensitive recording paper.

12. An image recording member as in claim 1, wherein said recording member is an electricity-sensitive recording paper.

13. An image recording member as in claim 1, wherein said recording member is a light-sensitive recording sheet.

14. An image recording member as in claim 10, wherein said pressure-sensitive copying paper comprises a layer of said dye precursor in a solvent dispersed in a binder on a support.

15. An image recording member as in claim 10, wherein said pressure-sensitive copying paper comprises a layer of said dye precursor in a solvent carried in microcapsules on a support.

16. An image recording member as in claim 11, wherein said heat-sensitive copying paper comprises a layer of said dye precursor and said electron acceptor dispersed in a binder on a support.

17. An image recording member as in claim 16, wherein said layer further comprises a heat meltable substance.

18. An image recording member as in claim 12, wherein said electricity-sensitive copying paper comprises a layer of said dye precursor, an electrically conductive substance and said electron acceptor dispersed in a binder on a support.

19. An image recording member as in claim 12, wherein said electricity-sensitive copy paper comprises a layer of said dye precursor and said electron acceptor dispersed in a binder on a layer of an electrically conductive substance on a support.

* * * * *